(12) United States Patent
Bi et al.

(10) Patent No.: US 8,442,004 B2
(45) Date of Patent: May 14, 2013

(54) SERVICE CONTINUITY DURING OUTBOUND HANDOVER FROM A HOME NETWORK BASE STATION WITH LOCAL INTERNET PROTOCOL ACCESS

(75) Inventors: Hao Bi, Lake Zurich, IL (US); Howard Benn, Swindon (GB); Scott Droste, Crystal Lake, IL (US); Jian Wu, Reading (GB)

(73) Assignee: Motorola Mobility LLC, Libertyville, IL (US)

( * ) Notice: Subject to any disclaimer, the term of this patent is extended or adjusted under 35 U.S.C. 154(b) by 600 days.

(21) Appl. No.: 12/493,440

(22) Filed: Jun. 29, 2009

(65) Prior Publication Data

US 2010/0329205 A1 Dec. 30, 2010

(51) Int. Cl.
*H04W 4/00* (2009.01)
(52) U.S. Cl.
USPC .................. 370/331; 455/435.1; 455/436
(58) Field of Classification Search ... 370/328; 455/434, 455/435.1, 436
See application file for complete search history.

(56) References Cited

U.S. PATENT DOCUMENTS

| 2007/0253359 | A1 | 11/2007 | Hall et al. | |
| 2010/0075670 | A1* | 3/2010 | Wu | 455/434 |
| 2010/0238858 | A1* | 9/2010 | Kim et al. | 370/328 |
| 2011/0177814 | A1* | 7/2011 | Buchmayer et al. | 455/435.1 |
| 2011/0294509 | A1* | 12/2011 | Kim et al. | 455/436 |

FOREIGN PATENT DOCUMENTS

WO 2008/132163 A1 11/2008

OTHER PUBLICATIONS

Reply to Letter Re Non-English Language Application Papers in a Provisional Application, by Andrew S. Park & Ye-Jin Oh, May 30, 2012, 2 pages.*
"Restoration to Communication via CSG Cell in Home (e)NB System" (English translation of the Specification of the U.S. Appl. No. 61/150,785), by Tae Hyeon Kim, et al., May 30, 2012, 7 pages.*
Hao Bi; U.S. Appl. No. 12/407,912, filed Mar. 20, 2009.
Hao Bi et al.; U.S. Appl. No. 12/408,959, filed Mar. 23, 2009.
3GPP TS 22.220 V9.0.0; 3rd Generation Partnership Project; Technical Specification Group Services and System Aspects; Service Requirements for Home NodeBs and Home eNodeBs; Release 9; Mar. 2009.
3GPP TS 23.401 V9.0.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 9; Mar. 2009.
Hao Bi et al.; U.S. Appl. No. 12/435,559, filed May 5, 2009.
International Search Report Issued in Connection with Related PCT Application No. PCT/US2010/037861.
3GPP TR 24.801; 3rd Generation Partnership Project; Technical Specification Group Core Network and Terminals; 3GPP System Architecture Evolution; CT WG1 Aspects (Release 8) Dec. 1, 2008.

* cited by examiner

*Primary Examiner* — Albert T Chou (57) ABSTRACT

A method, a mobile system, and a home network base station are disclosed. A mobile management entity 502 may generate a local network access disable notification message element 650 to provide available options to a mobile system 104 for establishing packet data network connectivity upon an access loss to a home network base station 110. The mobile management entity 502 may send the local network access disable notification message element 650 to the mobile system 104 upon an imminent local network access loss event.

20 Claims, 10 Drawing Sheets

SERVICE CONTINUITY DURING OUTBOUND HANDOVER FROM A HOME NETWORK BASE STATION WITH LOCAL INTERNET PROTOCOL ACCESS

FIELD OF THE INVENTION

The present invention relates to a method and system for handing off from a home network. The present invention further relates to transitioning from local internet protocol access to a mobile network.

INTRODUCTION

A mobile system may access a universal terrestrial radio access network (UTRAN) and an evolved UTRAN (E-UTRAN) cellular network through base stations installed at domestic homes or belonging to business and commercial enterprises, called Home NodeB (HNB) in UTRAN and Home eNodeB (HeNB) in E-UTRAN. The HNB or the HeNB may be part of an at least partially wireless local area network (LAN) referred to as a home network. The HNB or HeNB may provide access to both a core mobile network and the home network.

SUMMARY OF THE INVENTION

A method, a mobile system, and a home network base station are disclosed. A mobile management entity may generate a local network access disable notification message element to provide available options to a mobile system for establishing packet data network connectivity upon an access loss to a home network base station. The mobile management entity may send the local network access disable notification message element to the mobile system upon an imminent local network access loss event.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, a mobile system, and a home network base station, and other embodiments that relate to the basic concepts of the invention. The mobile system may be any manner of computer, mobile device, or wireless communication device.

A method, a mobile system, and a home network base station are disclosed. A mobile management entity may generate a local network access disable notification message element to provide available options to a mobile system for establishing packet data network connectivity upon an access loss to a home network base station. The mobile management entity may send the local network access disable notification message element to the mobile system upon an imminent local network access loss event.

Figure 1:
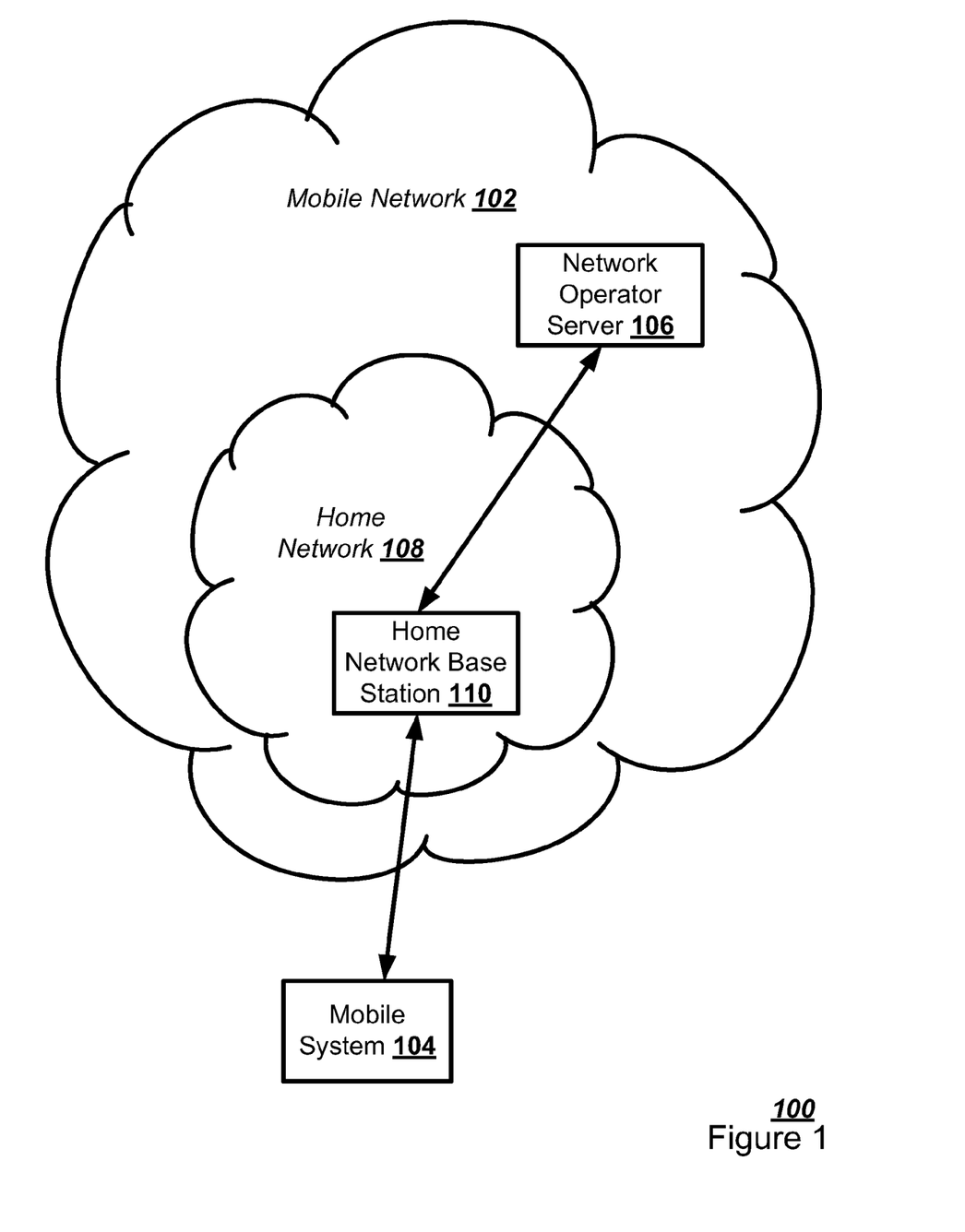
FIG. 1 illustrates in a block diagram one embodiment of a communication system.

FIG. 1 illustrates one embodiment of a communication system 100. The communication system 100 may include a core mobile network 102 that may be accessed by at least one mobile device 104, such as an electronic device, mobile system, or user equipment (UE). Various communication devices may exchange data or information through the core mobile network 102. The core mobile network 102 may be a WiMAX network, a universal terrestrial radio access network (UTRAN) cellular network, an evolved UTRAN (E-UTRAN) cellular network, or other type of telecommunication network. A server or a series of servers controlled by a network operator, referred to herein as a network operator server 106, may administer the network. The network operator server 106 may maintain a set of data to facilitate access of the core mobile network 102 by the mobile system 104.

A home, office, or other localized setting may maintain a home network 108. The home network 108 may be an at least partially wireless local area network (LAN) connected to the core mobile network 102. The home network 108 may be connected to the core mobile network 102 via one or more home network base stations 110, such as a home NodeB (HNB) or a home evolved NodeB (HeNB). The mobile system 104 may use the home network base station 110 to access either the mobile network 102 or the home network 108 through the home network base station 110. The home network base station 110 may allow a mobile system 104 access, if the mobile system 104 is a part of a closed subscriber group (CSG) associated with the home network 108. The mobile system 104 may store a list of CSG identifiers (ID), or a CSG ID list, detailing which kinds of home network base station 110 the mobile system 104 may access. The network operator server 106 may store the CSG ID list to administer access to the various home networks.

If the home network base station 110 is a closed mode base station, a mobile system 104 may connect with the home network base station 110 if the mobile system 104 is a member of the associated CSG. If the home network base station 110 is a hybrid base station or open base station, a mobile system 104 may use the home network base station 110 to connect with the mobile network 102 even if the mobile system 104 is not a member of the associated CSG.

Figure 2:
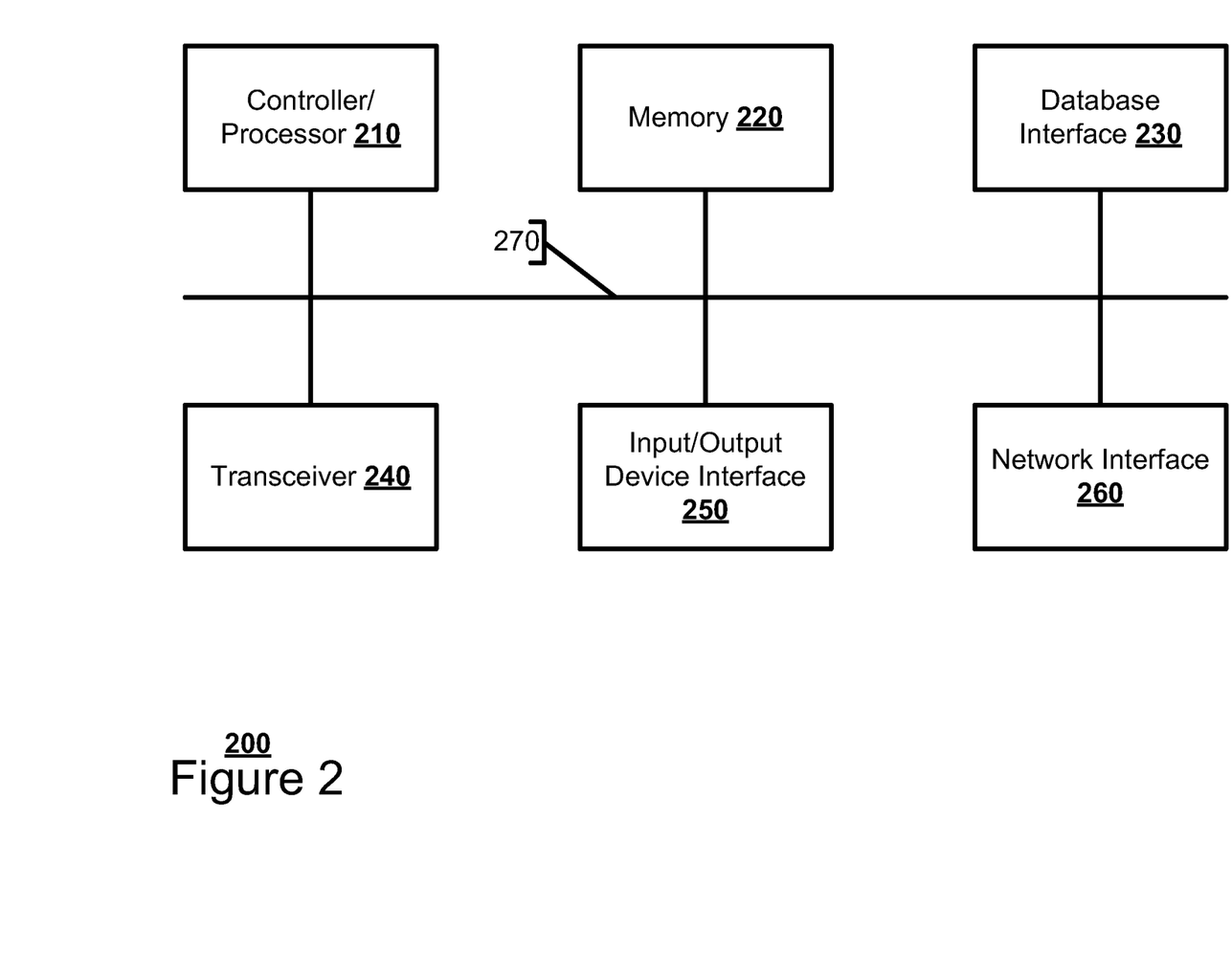
FIG. 2 illustrates a possible configuration of a computing system to act as a base transceiver station.

FIG. 2 illustrates a possible configuration of a computing system 200 to act as a network operator server 106 or a home network base station 110. The computing system 200 may include a controller/processor 210, a memory 220, a database interface 230, a transceiver 240, input/output (I/O) device interface 250, and a network interface 260, connected through bus 270. The network server 200 may implement any operating system. Client and server software may be written in any programming language, such as C, C++, Java or Visual Basic, for example. The server software may run on an application framework, such as, for example, a Java® server or .NET® framework The controller/processor 210 may be any programmed processor known to one of skill in the art. However, the decision support method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this invention.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM, digital video disc-read only memory (DVD-ROM), DVD read write input, tape drive, or other removable memory device that allows media content to be directly uploaded into the system.

Data may be stored in the memory or in a separate database. The database interface 230 may be used by the controller/processor 210 to access the database. The database may contain a subscriber information set for each mobile system that may access the mobile network 102 or a home network 108.

The transceiver 240 may create a connection with the mobile device 104. The transceiver 240 may be incorporated into a base station 200 or may be a separate device.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network. The network connection interface 260 may be used to connect a client device to a network. The network interface 260 may connect the home network base station 110 to a mobility management entity of the network operator server 106. The components of the network server 200 may be connected via an electrical bus 270, for example, or linked wirelessly.

Client software and databases may be accessed by the controller/processor 210 from memory 220, and may include, for example, database applications, word processing applications, as well as components that embody the decision support functionality of the present invention. The network server 200 may implement any operating system. Client and server software may be written in any programming language. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
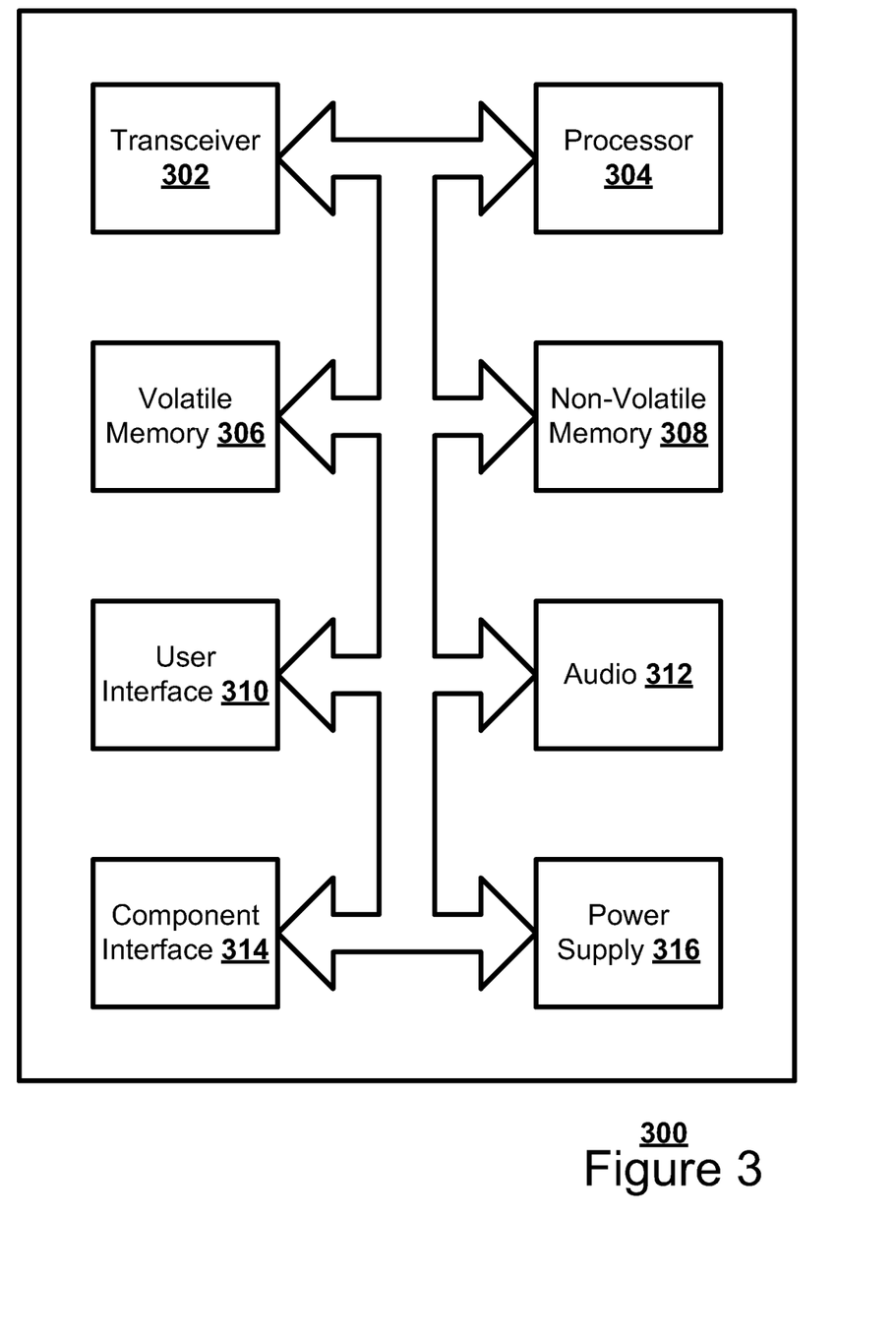
FIG. 3 illustrates, in a block diagram, one embodiment of a mobile system or electronic device to create a radio connection.

FIG. 3 illustrates one embodiment of a mobile device 300, capable of acting as a mobile system or electronic device. For some embodiments of the present invention, the mobile device 300 may also support one or more applications for performing various communications with a network. The mobile device 300 may be a handheld device, such as, a mobile phone, a laptop, or a personal digital assistant PDA). For some embodiments of the present invention, the user device 300 may be WiFi® capable device, which may be used to access the network mobile for data or by voice using VOIP.

The mobile device 300 may include a transceiver 302, which is capable of sending and receiving data over the mobile network 102. The mobile device 300 may include a processor 304 that executes stored programs. The mobile device 300 may also include a volatile memory 306 and a non-volatile memory 308 to act as data storage for the processor 304. The mobile device 300 may include a user input interface 310 that may comprise elements such as a keypad, display, touch screen, and the like. The mobile device 300 may also include a user output device that may comprise a display screen and an audio interface 312 that may comprise elements such as a microphone, earphone, and speaker. The mobile device 300 also may include a component interface 314 to which additional elements may be attached, for example, a universal serial bus (USB) interface. Finally, the mobile device 300 may include a power supply 316.

Figure 4:
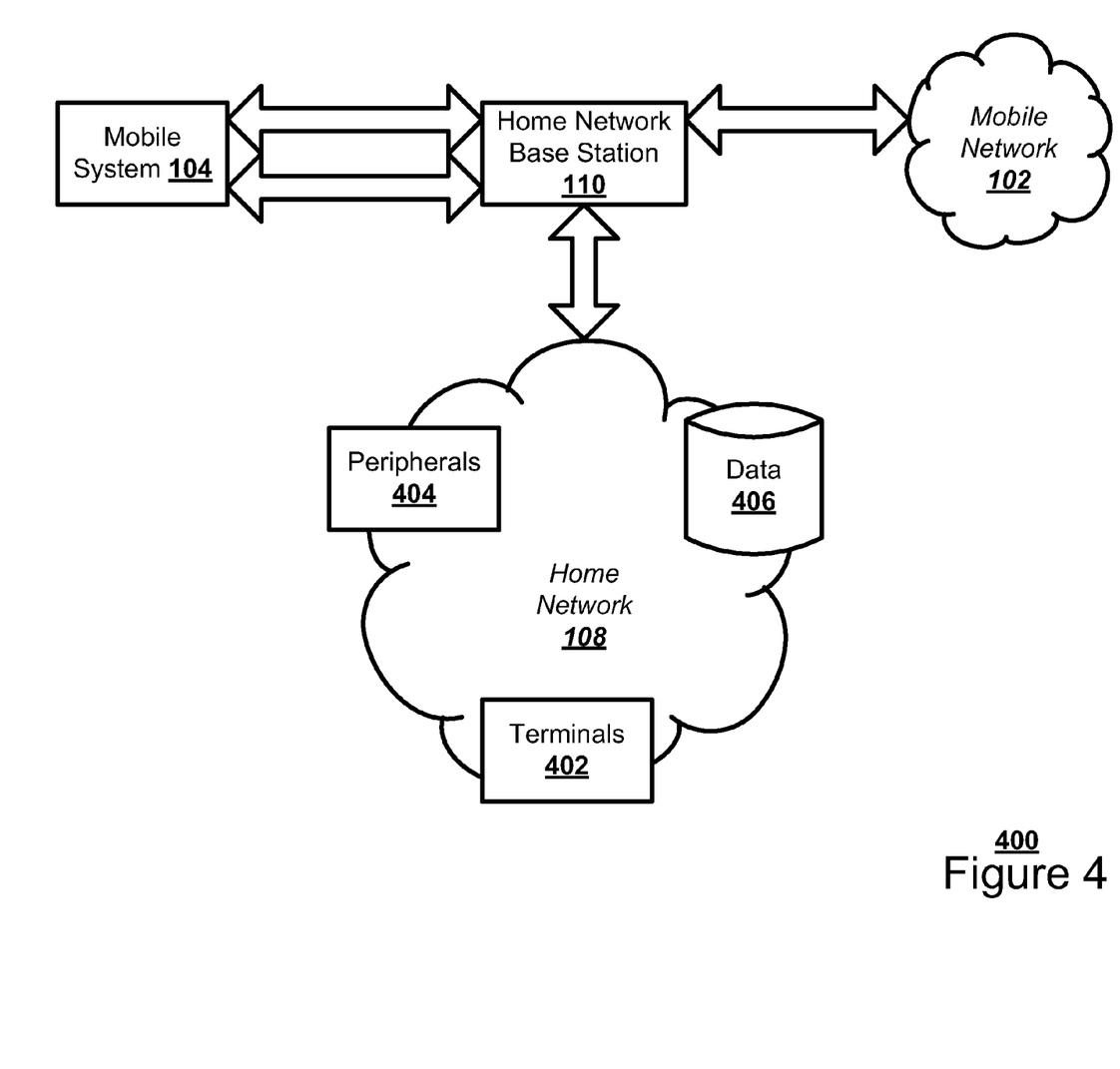
FIG. 4 illustrates, in a block diagram, one embodiment of a home network interaction.

FIG. 4 illustrates, in a block diagram, one embodiment of a home network interaction 400. A mobile system 104 may access a mobile network 102, or core mobile network 102, via the home network base station 110, such as if the home network base station 110 is on the CSG ID list for the mobile system 104. Additionally, the home network 108 is attached to the home network base station 110. The mobile system 104 may access the home network 108. Local internet protocol access may provide a directly connected, IP capable mobile system 104 access to other IP capable devices in the home network 108 and to the internet through the home network 108. A home network owner may have control over access to the home network 108. The home network base station 110 may provide varying degrees of access to a portion of the home network 108 based on the mobile trust level provided by the network operator server 106. For example, the home network owner may allow a guest user to use the home network 108 to access the core mobile network 102 for voice, media, or other data sets.

For example, a mobile system 104 with a low mobile trust level may be limited to sending and receiving communications to user terminals 402 on the home network 108 or limited to contact with the mobile network 102. A mobile system 104 with an intermediate mobile trust level may user peripheral devices 404 connected to the home network 108, such as printers, audio players, video displays, and other peripheral devices. A mobile system 104 with a high mobile trust level may access data 406 stored in the home network 108.

Figure 5:
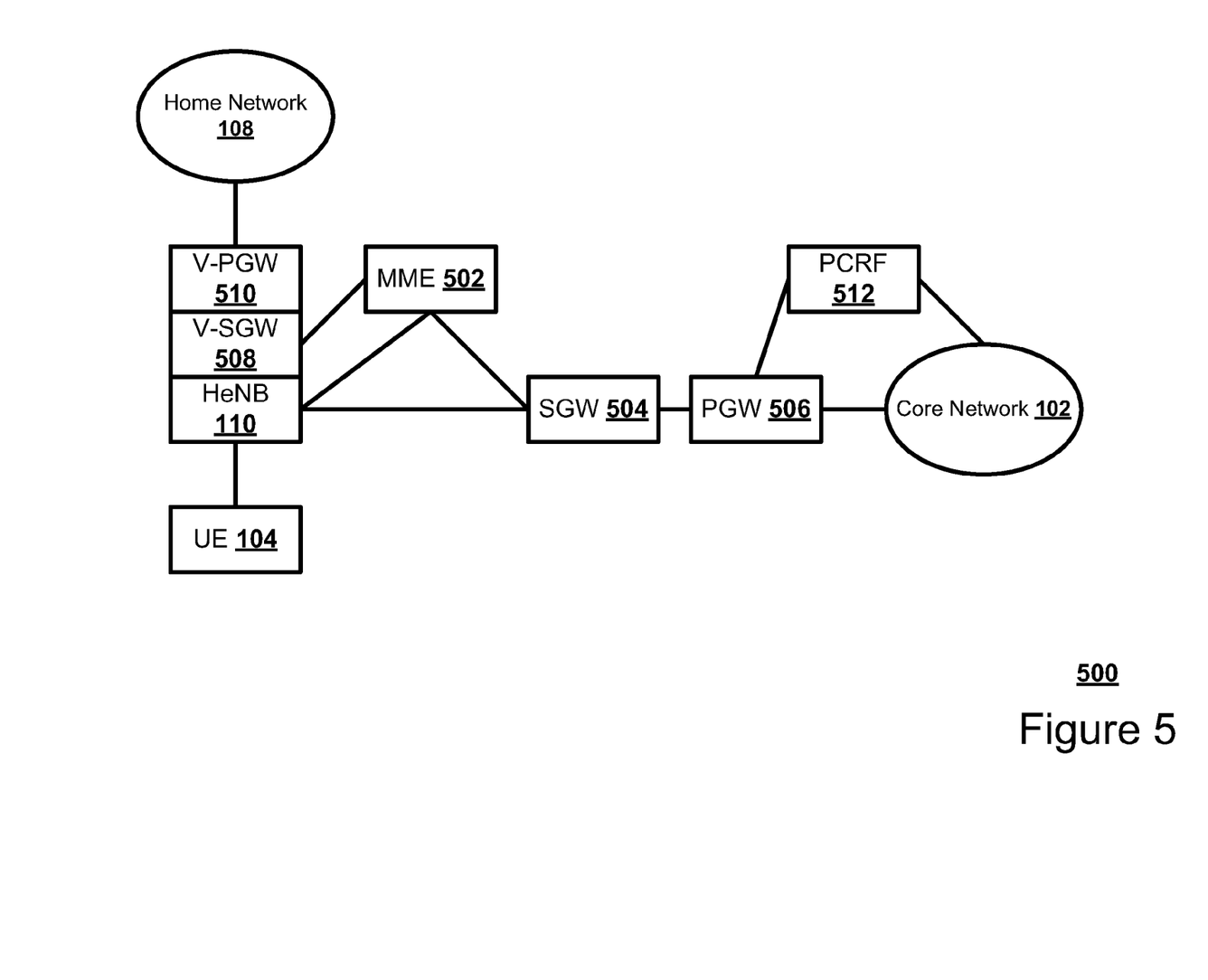
FIG. 5 illustrates, in a block diagram, one embodiment of the network architecture for a home network.

FIG. 5 illustrates, in a block diagram, one embodiment of the network architecture 500 connecting a home network 108 and a mobile operator's core network 102. A mobility management entity (MME) 502 may use the home network base station (HeNB) 110 to control the interaction between the mobile system 104, or user equipment (UE), and the home based internet protocol (IP) network 108 or the mobile operator's core IP network 102. A serving gateway (SGW 504 may route user data packets. A packet data network (PDN) gateway (PGW 506 may connect the UE 104 to an external PDN. The HeNB 110 may perform local IP access support function by modeling a virtual SGW (V-SGW) 508 and a virtual PGW (V-PGW) 510. The V-SGW 508 may provide an evolved packet system (EPS) connection management (ECM) idle mode for downlink packet buffering and an initiation of a network triggered service request procedure. The V-SGW 508 may collect uplink and downlink traffic statistics. The V-PGW 510 may allocate the UE IP address to access the home based IP network 108. The V-PGW 510 may provide dynamic host configuration protocol functions. A policy and charging rules function (PCRF) module 512 may provide network control regarding the service data flow detection, gating, quality of service (QoS), and flow based charging.

During the course of an interaction between a mobile system 104 and the home network 108, the mobile system 104 may lose the local internet protocol (IP) access capability. The MME 502 may send a non-access stratum (NAS) local access disable notification message element to a mobile system 104 when the mobile system 104 is about to lose that local IP access capability. The MME 502 may send the local access disable notification message element when the MME 502 detects that a local network access loss event is imminent, such as when the user's subscription to the CSG associated with the home network base station 110 is about to expire or when a handover out of the home network base station 110 is requested for the mobile system 104. The local access disable notification message element may inform the mobile system 104 that the mobile system 104 is about to lose access to the home based network 108, the cause for that loss, and the kind of IP traffic that may be routed thereafter through the operator's core network 102 to avoid service disruption. The local access disable notification message element may be sent in a new message, or attached to other messages, such as a "Modify EPS Context Request," or "Deactivate EPS Bearer Context Request."

Among other data, the local access disable notification message element may include the cause of disabling, the traffic flow template (TFT) for the IP traffic to be directed through the operator's core network, and the access point name (APN) for the mobile system 104 to establish PDN connectivity towards the operator's core network 102.

The EPS bearers, which may be established towards the operator's core network 102, may be maintained when a mobile system 104 is handed over from a home network base station 110 to another cell. In order to maintain service continuity of IP applications, IP traffic may be put on the EPS bearers established towards the operator's core network 102, before the subscription expires or the mobile system is handed out of the home network base station 110. A mobile system 104 may use an APN of the local access disable notification message element to open new PDN connectivity towards the operator's core network 102. Once the new PDN connectivity is established, mobile system 104 may put the IP traffic, which used to be routed using local IP access through home based network 108, on the EPS bearers established towards the operator's core network 102. This way, service continuity may be maintained even when the local IP access to the home based network 108 is disabled.

The MME 502 may also indicate the type of IP traffic for which service continuity may be maintained by sending the related TFT in the local access disable notification message element. A TFT may include a set of packet filters defining the IP traffic to be carried on the associated bearer. The packet filter may define a variety of rules, such as specifying IP traffic destined to particular sites or of particular applications to be carried on the associated bearer. For example, the TFT may define a remote address type, a protocol identifier or next header type, a single local port type, a local port range type, a single remote port type, a remote port range type, a security parameter index type, a type of service or traffic class type, a flow label type, or other rules.

Using APN and TFT, the network may pick the IP services, as indicated by the TFT, to support service continuity and tailor the available resources on the operator's core network to support the selected IP traffic through the targeted PDN, as indicated by the APN.

Figure 6:
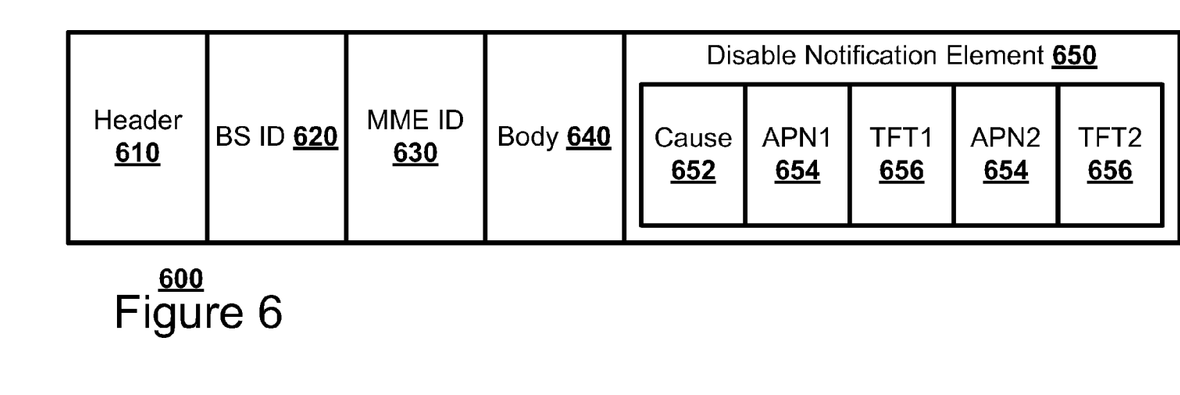
FIG. 6 illustrates, in a block diagram, one embodiment of an appended access status message.

FIG. 6 illustrates, in a block diagram, one embodiment of an appended disable message 600. The appended disable message 600 may have a header 610 to indicate the route and destination, a network base station identifier (BS ID) 620, a MME ID 630, and a body 640 containing message data. Additionally, the MME 502 or the home network base station 110 may append a local network access disable notification message element 650 to the message 600. The local network access disable notification message element 650 to provide available options to a mobile system for establishing packet data network connectivity upon an access loss to a home network base station 110. The local network access disable notification message element 650 may have a cause field 652 indicating the cause of connection loss event, an APN field 654 to indicate a PDN through which data may be routed, and an associated TFT 656 indicating a data traffic type for the data packet bearer to be routed through the targeted PDN. The connection loss event may be an approaching subscription expiration or a geographic attenuation causing a loss of service. The local network access disable notification message element 650 may have multiple APN fields 654 and associated TFTs 656, allowing the mobile system 104 to be instructed to establish different data packet bearers towards different PDNs based on the type of data traffic indicated by the respective TFT.

When the cause of the impending loss of local IP access is due to the expiration of a subscription to the CSG associated with home network base station 110, the mobile system 104 may notify the user of this event so that the user may renew his subscription, if desired. The user may request to extend his subscription for extra minutes, hours, or days. The user may also request permanent membership to the CSG. A CSG membership request message element may be sent from the mobile system 104 to MME 502 for this purpose.

Furthermore, the user may also request to switch the connection to another home network base station 110 associated with a CSG with which the user has an active membership. That is, the user may select the identity of another CSG, and request for a handover to the home network base station 110 associated with that new CSG. The mobile system 104 may include the identity of the CSG in the CSG membership request message element to be sent to the MME 502. After receiving the CSG identity manually selected by the user, the MME 502 may send a message to the current home network base station 110 to trigger a handover. The MME 502 may either filter out all but the home network base station 110 associated with the selected CSG to be the valid handover target, or provide or update a CSG restriction list to the current home network base station 110, so that the current home network base station 110 chooses the home network base station 110 associated with the selected CSG as the valid handover candidate.

Therefore, the mobile system 104 may use these two parameters, CSG ID and expiry time, in the CSG membership request message element to request a variety of actions to prevent a loss of service. If the expiry time is present, the MME 502 may extend the subscription to the CSG associated with the current home network base station 110. If the CSG ID is present, the MME 502 may request handover of the mobile system 104 to a home network base station 110 associated with the CSG ID manually selected by the user. If both the CSG ID and the expiry time are present, the MME may extend the subscription to the selected CSG, and, if it succeeds, may request handover to a home network base station 110 associated with the selected CSG.

Even if appropriate actions are not completed before the connectivity through the local IP access is terminated, the local access disable notification message element 650 may still be sent to the mobile system 104 after the local IP access is lost. The local access disable notification message element 650 may still help the mobile system 104 have EPS bearers re-established before the IP application is disrupted.

Figure 7:
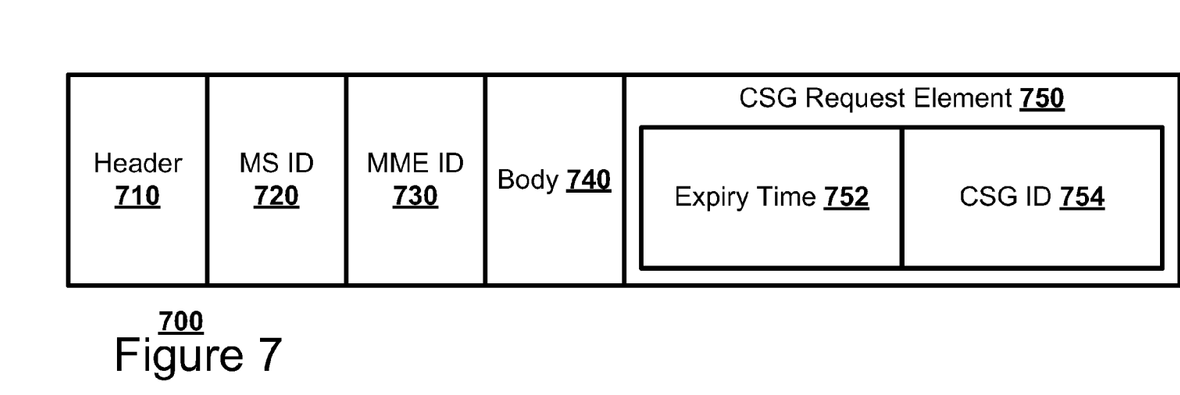
FIG. 7 illustrates, in a block diagram, one embodiment of an appended access response message.

FIG. 7 illustrates, in a block diagram, one embodiment of an appended request message 700. The appended request message 700 may have a header 710 to indicate the route and destination, a mobile system identifier (MS ID) 720, a MME ID 730, and a body 740 containing message data. Additionally, the mobile system 104 may append a CSG membership request message element 750 to the message 700. The CSG membership request message element 750 may have an expiry time 752 indicating a desired extension to the subscription period and a CSG ID 754 instructing the home network base station 110 to hand over the mobile system 104 to a home network designate associated with the CSG ID.

Figure 8:
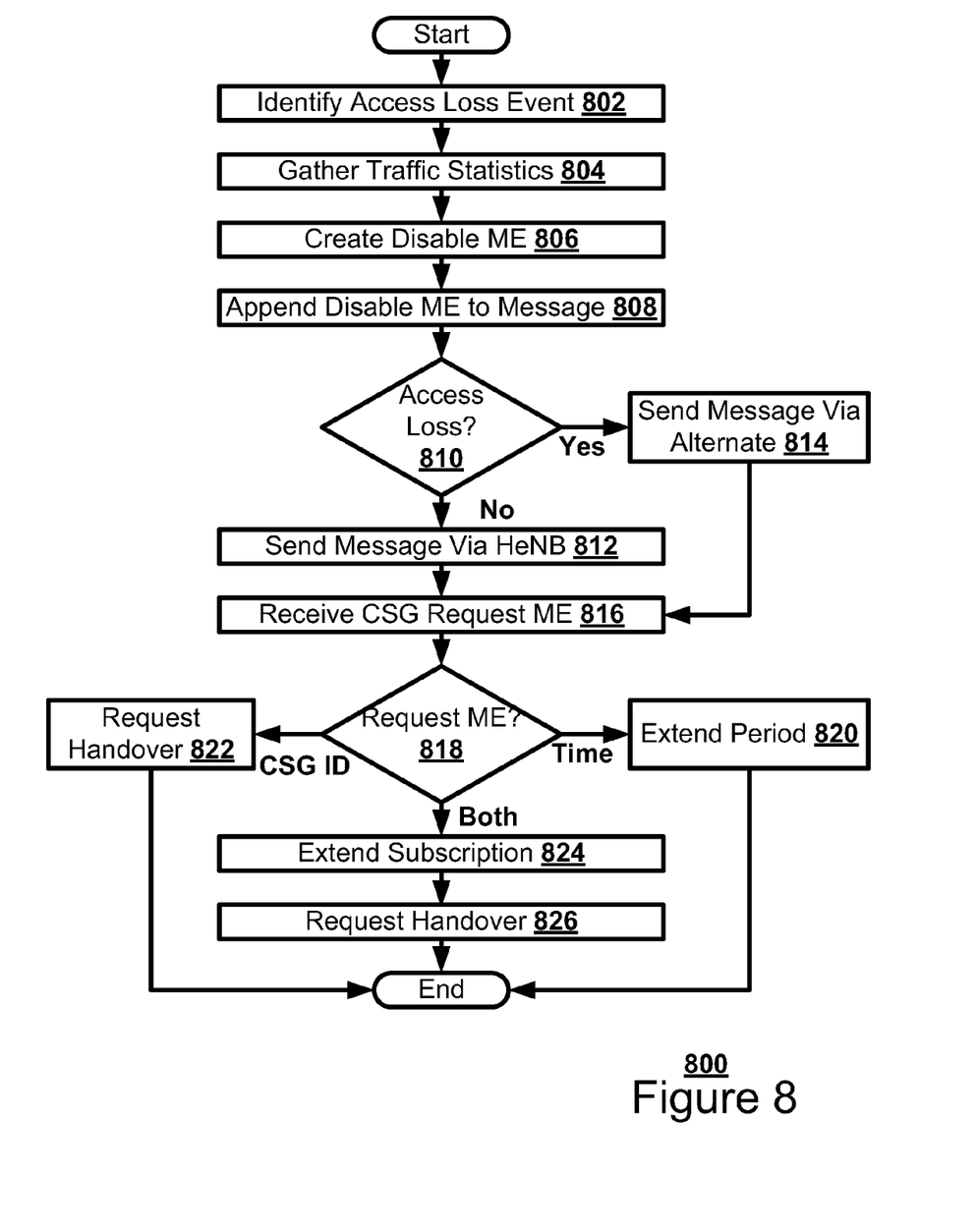
FIG. 8 illustrates, in a flowchart, one embodiment of a method for managing access with a mobility management entity.

FIG. 8 illustrates, in a flowchart, one embodiment of a method 800 for managing access with a MME 502. The MME 502 may identify an imminent access loss event for a mobile system 104 (Block 802). The MME 502 or the home network base station 110 may determine that the access loss event is caused by the expiration of a subscription period. Alternately, the home network base station 110 may identify the imminent access loss event due to a geographic attenuation, caused by the mobile system 104 being moved physically too far from the home network base station 110 for the network connection to be maintained. The home network base station 110 may then notify the MME 502 in this scenario. The MME 502 may gather traffic statistics for one or more available home network alternatives, such as other nearby home network base stations 110, a cell base station, or different PDNs connected to the mobile core network 102 (Block 804). The MME 502 may create a local network access disable notification message element (ME) 650 by associating an APN field 654 and the TFT 656 based on the gathered traffic statistics for appropriate network resource reservation or load balancing (Block 806). The local network access disable notification ME 650 may provide available options to a mobile system for establishing PDN connectivity upon an access loss to a home network base station 110. The MME 502 may append the local network access disable notification message element 650 to a message 600 directed to the mobile system 104 (Block 808). Alternately, the local network access disable notification message element may be sent to the mobile system 104 without being appended to a different message 600. If the access loss event has not yet occurred (Block 810), the MME 502 may send the appended message 600 via the home network base station (HeNB) 110 (Block 812). If the access loss event has occurred to the home network base station 110 (Block 810), the MME 502 may send the appended message 600 via a network alternative, either nearby home network base stations or cell base stations, whichever the mobile system 110 is connecting to (Block 814). The MME 502 may then receive a CSG membership request ME 750 generated by the mobile system 104 in response to the local network access disable notification ME 650 (Block 816). If the CSG membership request ME 750 has an expiry time 752 (Block 818), the MME 502 may extend the subscription period of the CSG associated with the current home network base station 110 in response to the CSG membership request ME 750 (Block 820). If the CSG membership request 750 has a CSG ID 754 (Block 818), the MME 502 may request that the current home network base station 110 may handover the mobile system 104 to a home network designate associated with the CSG ID 754 indicated in the CSG membership request ME 750 (Block 822). If the CSG membership request ME 750 has an expiry time 752 and a CSG ID 754 (Block 818), the MME 502 may extend the subscription period of the CSG ID 754 (Block 824) and request that the current home network base station 110 handover the mobile system 104 to a home network designate associated with the CSG ID 754 (Block 826).

Figure 9:
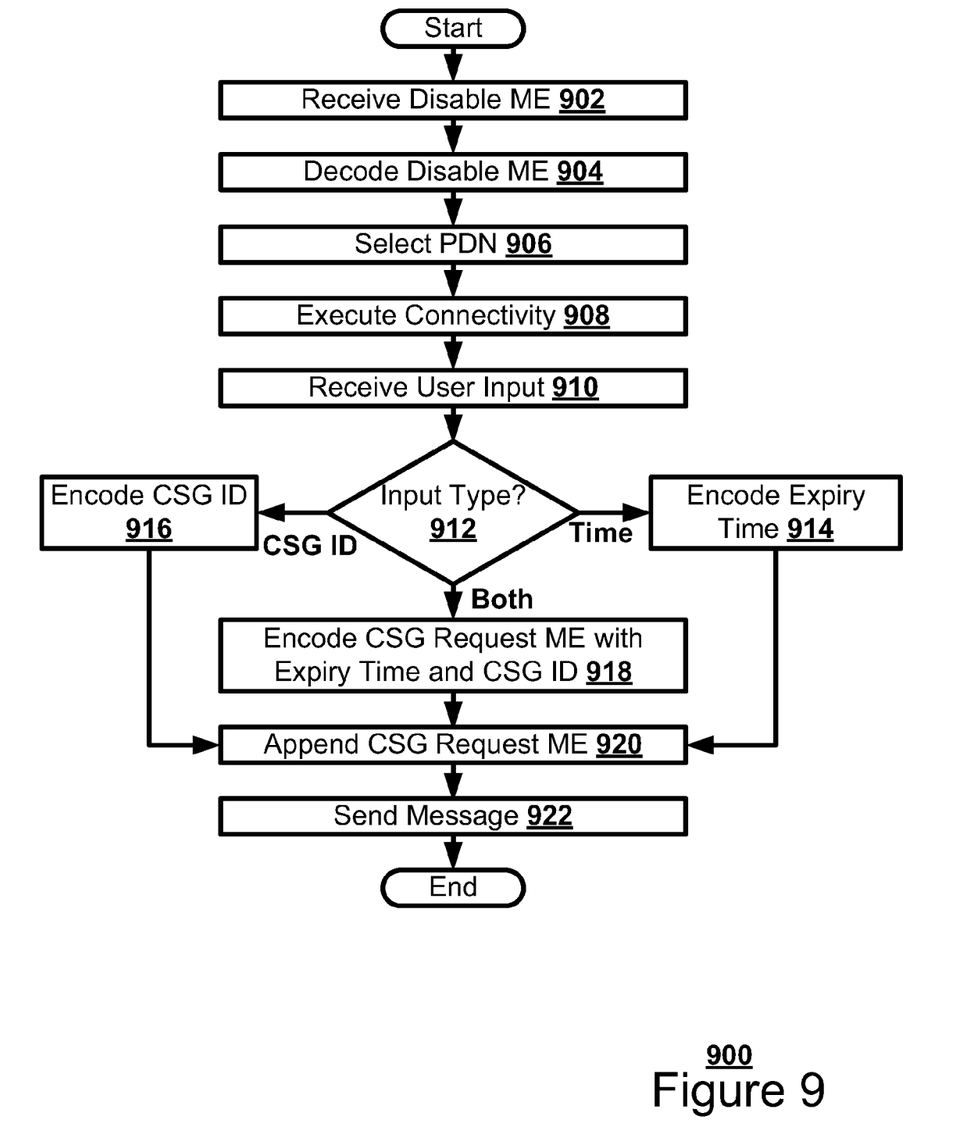
FIG. 9 illustrates, in a flowchart, one embodiment of a method for managing access with a mobile system.

FIG. 9 illustrates, in a flowchart, one embodiment of a method 900 for managing access with a mobile system 104. The mobile system 104 may receive a local network access disable notification ME 650 indicating an access loss to a home network is likely (Block 902). The mobile system 104 may decode the local network access disable notification ME 650 to determine the cause of the potential access loss to the current home network base station 110, and to determine a connectivity action for the mobile system 104 to execute based upon the instructions on how to route different data traffic types on different data packet bearers, as indicated by TFT, through different PDNs, as indicated by the APNs (Block 904). The mobile system 104 may make an initial connection selection to establish the data packet bearer to the PDN indicated by the APN for the data traffic type indicated by the TFT (Block 906). The mobile system 104 may execute connectivity for a data traffic type to be routed on a packet data bearer through a packet data network based on the local network access disable notification ME 650 (Block 908). Alternately, the mobile system 104 may receive a plurality of pairs of APN 654 and TFT 656 in the local network access disable notification ME 650. The mobile system 104 may execute connectivity for a plurality of data traffic types to be routed on a plurality of packet data bearers through a plurality of packet data networks based on the local network access disable notification ME 650. The mobile system 104 may receive a further user input to alter or override the initial selection (Block 910). The mobile system 104 may use this user input to generate a CSG membership request ME 750 to request further connectivity action. If the user input is an expiry time 752 indicating an extension to the subscription period (Block 912), the mobile system 104 may encode the expiry time 752 into the CSG membership request ME 750 (Block 914). If the user input is a CSG ID 754 indicating a home network designate (Block 912), the mobile system 104 may encode the CSG ID 754 into the CSG membership request ME 750 (Block 916). If the user input is an expiry time 752 and a CSG ID 754 (Block 912), the mobile system 104 may encode the expiry time 752 and the CSG ID 754 into the CSG membership request ME 750 (Block 918). The mobile system 104 may append the CSG membership request ME 750 to a message sent to the MME 502 (Block 920). The mobile system 104 may then send the appended message 700 to the MME 502 (Block 922). Alternately, the CSG membership request ME 750 may be sent without being appended to a message 700.

In an alternate embodiment, the mobile system 104 may generate the CSG membership request ME 750 and transmit the CSG membership request ME 750 to the MME 502 without first receiving a local network access disable notification message element 650. The mobile system 104 may track its subscription period for the home network 108, and send the CSG membership request ME 750 as the subscription period expires. The mobile system 104 may track the geographical attenuation of its signal with the home network base station 110, and send the CSG membership request ME 750 as the signal deteriorates. Further, upon receipt of a local network access disable notification message element 650, the mobile system 104 may proceed with a handover to a home network alternate 110 without sending the CSG membership request ME 750.

Figure 10:
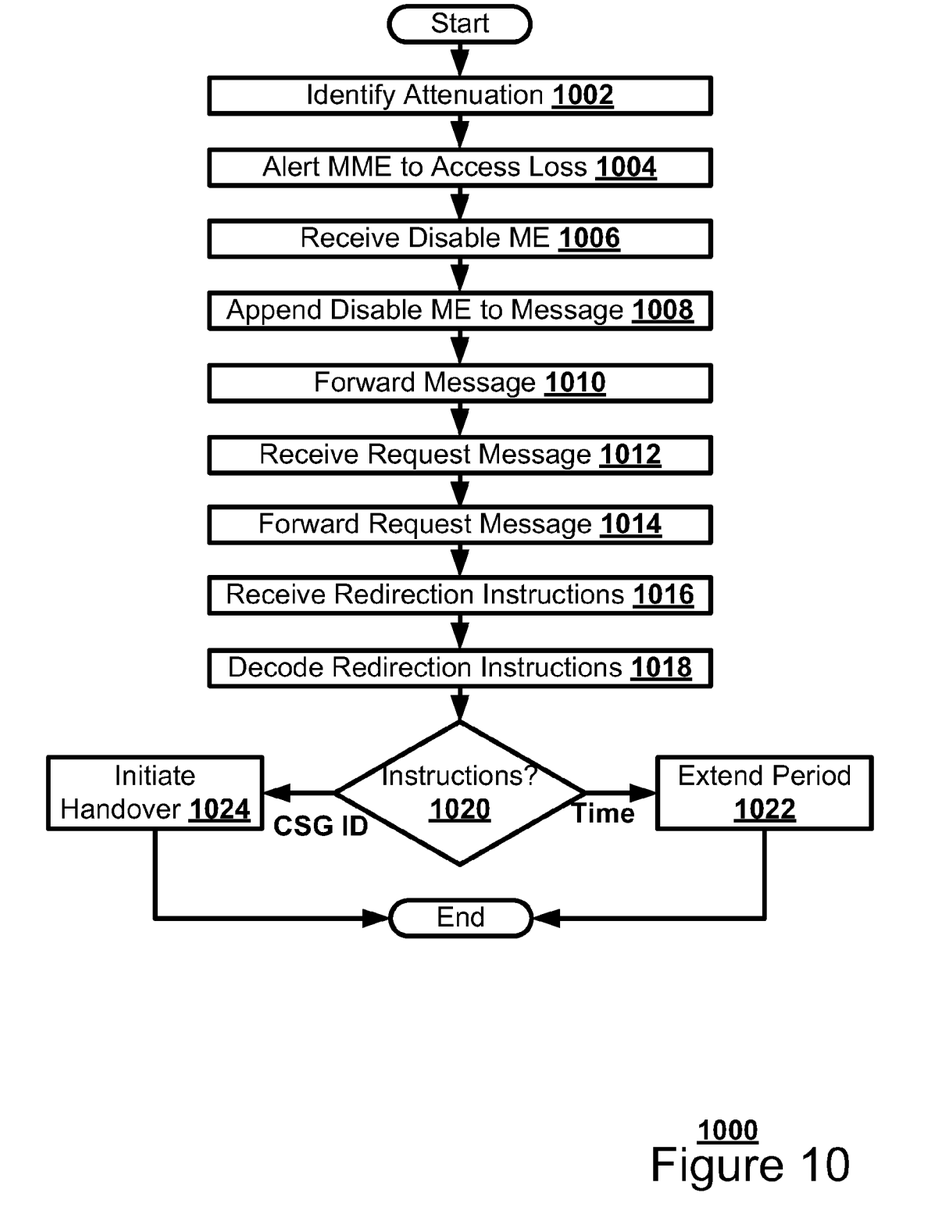
FIG. 10 illustrates, in a flowchart, one embodiment of a method for managing access with a home network base station.

FIG. 10 illustrates, in a flowchart, one embodiment of a method 1000 for managing access with a home network base station 110. The home network base station 110 may identify an imminent local network access loss event by the mobile system 104, possibly caused by geographic attenuation or a subscription expiration (Block 1002). The home network base station 110 may alert the MME 502 of the imminent local network access loss event (Block 1004). Alternately, if the cause of the imminent local network access loss event is a subscription expiration, the MME 502 may identify the imminent local network access loss. The home network base station 110 may receive a local network access disable notification ME 650 from the MME 502 (Block 1006). The home network base station 110 may append the local network access disable notification ME 650 to a message directed to the mobile system 104 (Block 1008). Alternately, the local network access disable notification ME 650 may be already appended to a message when received by the home network base station 110. The home network base station 110 may forward the appended message 600 to the mobile system 104 (Block 1010). Alternately, the home network base station 110 may forward the local network access disable notification ME 650 without appending it to another message. The home network base station 110 may receive a message 700 with an appended CSG membership request ME 750 from the mobile system 104 in response to the local network access disable notification ME 650 (Block 1012). The home network base station 110 may receive the CSG membership request ME 750 without an appended message 700. The home network base station 110 may forward the message 700 with appended CSG membership request ME 750 to the MME 502 (Block 1014). The home network base station 110 may receive access redirection event instructions from the MME 502, such as in response to the CSG membership request ME 750 (Block 1016). The home network base station 110 may decode the redirection event instructions to determine a connectivity action to be executed by the home network base station 110 (Block 1018). If the decoded instructions include an expiry time (Block 1020), the home network base station 110 may execute the connectivity action of extending the subscription period (Block 1022). If the decoded instructions include CSG restriction information, either an explicit list containing a CSG ID information, such as from the CSG membership request ME or an implicit indication of using the CSG ID information of the current home network base station (Block 1020), the home network base station 110 may execute the connectivity action of initiating handover to a home network 108 of the identified CSG indicated by the CSG restriction information (Block 1024).

Figure 11:
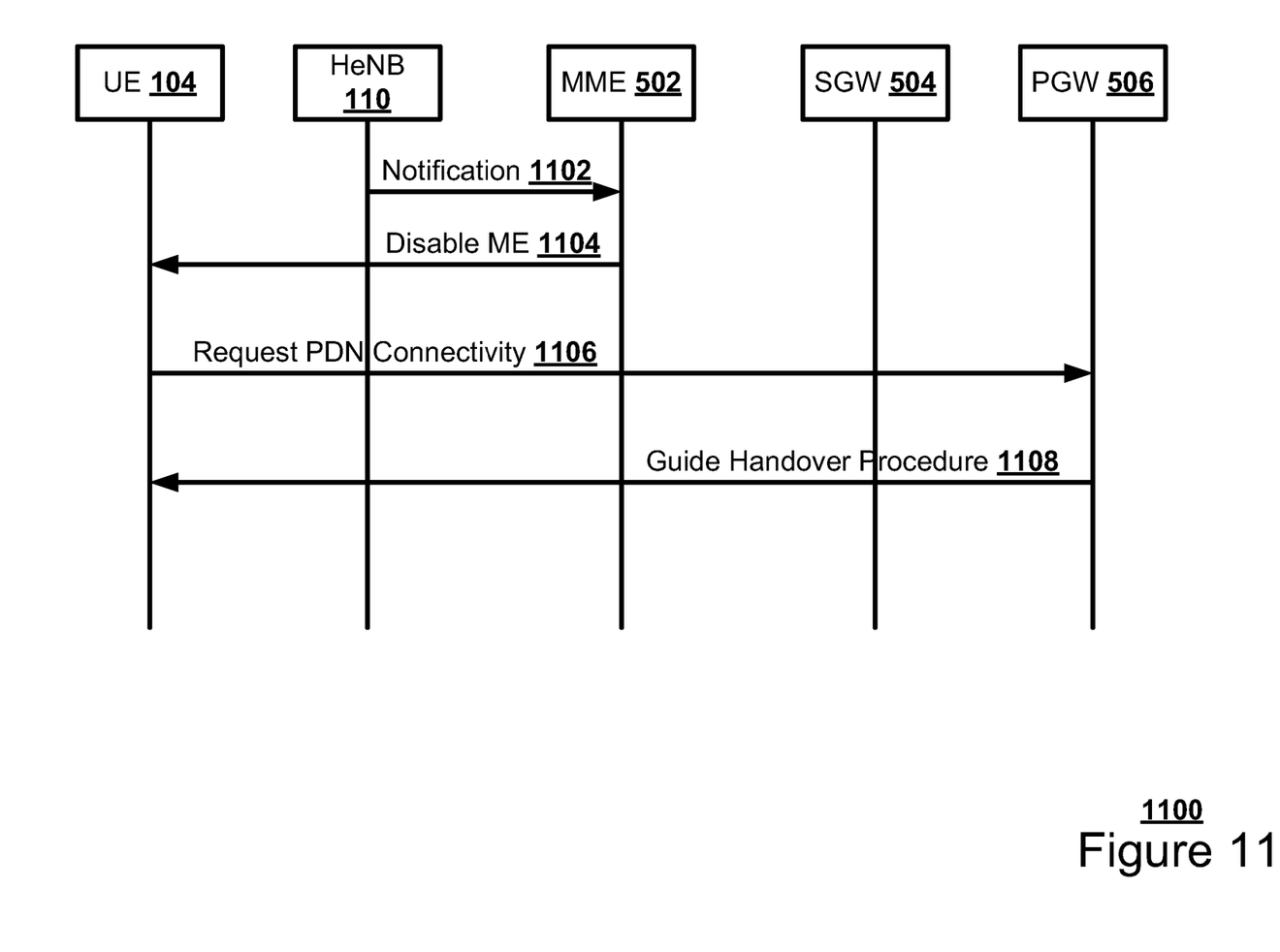
FIG. 11 illustrates, in a flow diagram, one embodiment of local internet protocol handoff.

FIG. 11 illustrates, in a flow diagram, one embodiment of local internet protocol handoff 1100. The home network base station 110 may send a notification 1102 to the MME 502 that a handover is imminent. The MME 502 may send a the local network access disable notification ME 1104 to the mobile system 104, containing a cause indicating handover and APN indicating the PDN to establish data bearers for data traffic indicated by the paired TFT. The mobile system 104 may send a request to the MME 502 for PDN connectivity 1106 through the PGW 506 associated with the obtained APN. Then handover procedure 1108 may be carried out with the mobile system 104 involving the home network base station 110, the MME 502, the SGW 504, and the PGW 506.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for managing access with a mobility management entity, comprising:
   generating a local network access disable notification message element to provide available options to a mobile system for establishing packet data network connectivity upon an access loss to a home network base station, where the home network base station provides access for the mobile system to a local area home network using a local access protocol and provides access to a core network; and
   sending the local network access disable notification message element to the mobile system upon an imminent local network access loss event.

2. The method of claim 1, wherein the local network access disable notification message element has a cause field describing the imminent local network access loss event.

3. The method of claim 1, wherein the local network access disable notification message element has an access point name field indicating a packet data network.

4. The method of claim 1, wherein the local network access disable notification message element has a traffic flow template indicating a data traffic type for a data packet bearer to be routed through a packet data network.

5. The method of claim 1, further comprising:
   associating based on traffic statistics for at least one available home network alternative an access point name field indicating a packet data network and a traffic flow template indicating a data traffic type.

6. The method of claim 1, further comprising:
   sending the local network access disable notification message element to the mobile system after the local network access loss.

7. The method of claim 1, further comprising:
   receiving a closed subscriber group membership request message element from a mobile system; and
   extending to the mobile system a subscription period for a closed subscriber group of the home network in response to the closed subscriber group membership request message element.

8. The method of claim 1, further comprising:
   receiving a closed subscriber group membership request message element from a mobile system; and
   directing the home network to handover the mobile system to a home network designate indicated in the closed subscriber group membership request message element.

9. A mobile system for accessing to a home network, comprising:
   a transceiver that receives from a mobile management entity a local network access disable notification message element providing available options for establishing packet data network connectivity upon an access loss to a home network base station, where the home network base station provides access for the mobile system to a local area home network using a local access protocol and provides access to a core network;
   a processor that executes a connectivity action based upon the local network access disable notification message element.

10. The mobile system of claim 9, wherein the local network access disable notification message element has at least one of a cause field describing a cause of the access loss.

11. The mobile system of claim 9, wherein the processor selects a data traffic type as indicated by a traffic flow template field to execute connectivity for service continuity.

12. The mobile system of claim 9, wherein the processor selects a packet data network through an access point name field to execute connectivity for service continuity.

13. The mobile system of claim 9, wherein the processor executes connectivity for a plurality of data traffic types to be routed on a plurality of packet data bearers through a plurality of packet data networks based on the local network access disable notification message element.

14. The mobile system of claim 9, wherein the processor generates a closed subscriber group membership request message element to request further connectivity action.

15. The mobile system of claim 14, wherein the closed subscriber group membership request message element has an expiry time received from a user indicating an extension to a subscription period.

16. The mobile system of claim 14, wherein the closed subscriber group membership request message element has a closed subscriber group identifier indicating a home network designate.

17. The mobile system of claim 14, wherein the closed subscriber group membership request message element is appended to a message sent to a mobility management entity.

18. A home network base station that connects to a mobile system, comprising:
   a network interface that receives from a mobile management entity an access redirection event instruction generated in response to a closed subscriber group membership request message element from the mobile system;
   a processor that decodes the access redirection event instruction to determine a connectivity action and executes the connectivity action.

19. The home network base station of claim 18, wherein the access redirection event instruction has an expiry time and the connectivity action is to extend the subscription period.

20. The home network base station of claim 18, wherein the access redirection event instruction has a closed subscriber group restriction information and the connectivity action is to initiate handover to a home network indicated by the closed subscriber group restriction information.

* * * * *